(12) United States Patent
Lewis et al.

(10) Patent No.: US 6,759,349 B2
(45) Date of Patent: *Jul. 6, 2004

(54) STABILIZATION OF SI PHOTOANODES IN AQUEOUS ELECTROLYTES THROUGH SURFACE ALKYLATION

(75) Inventors: Nathan S. Lewis, La Cañada, CA (US); Ashish Bansal, Lakewood, CO (US)

(73) Assignee: California Institute of Technology, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,125

(22) Filed: May 4, 1999

(65) Prior Publication Data

US 2002/0171082 A1 Nov. 21, 2002

Related U.S. Application Data

(60) Provisional application No. 60/084,277, filed on May 4, 1998.

(51) Int. Cl.[7] .............................................. H01L 21/469
(52) U.S. Cl. ........................ 438/780; 438/38; 438/765; 438/769; 438/778
(58) Field of Search ................................. 438/780, 789, 438/790, 38, 778, 781, 82, 99, 765, 769

(56) References Cited

PUBLICATIONS

Bansal, A., et al., "Alkylation of Si surfaces using a two–step halogenation/grignard route", *J. Am. Chem. Soc.*, 1996, vol. 118, No. 30, pp. 7225–7226.

Pomykal, K.E., et al., "Stability of n–Si/$CH_3OH$ contacts as a function of the reorganization energy of the electron donor", *J. Phys. Chem.*, 1995 vol. 99, pp. 8302–8310.

Rosenbluth, M.L., et al., "Kinetic studies of carrier transport and recombination at the n–silicon/methanol interface", *Journal of the American Chemical Society*, vol. 108, No. 16, Aug. 6, 1986, pp. 4689–4695.

WWW.chem.ox.ac.uk/mom/derrocene.html, "Ferrocene–molecule of the month Jun. 1996" p. 1.

*Primary Examiner*—George Eckert
*Assistant Examiner*—N. Drew Richards
(74) *Attorney, Agent, or Firm*—Gray Cary Ware & Freidenrich, LLP

(57) ABSTRACT

A two-step chlorination/alkylation technique used to introduce alkyl groups, —$C_nH_{2n+1}$ (n=1–6), functionally onto single-crystal, (111)-oriented, n-type Si surfaces. H-terminated Si photoanodes were unstable under illumination in contact with an aqueous 0.35 M $K_4Fe(CN)_6$-0.05 M$K_3Fe(CN)_6$ electrolyte. Such electrodes displayed low open-circuit voltages and exhibited a pronounced time-dependent deterioration in their current density vs potential characteristics due to anodic oxidation. In contrast, Si surfaces functionalized with —$CH_3$ and —$C_2H_5$ groups displayed significant improvements in stability while displaying excellent electrochemical properties when used as photoelectrodes in the aqueous $Fe(CN)_6^{3-/4-}$ electrolyte.

13 Claims, 4 Drawing Sheets

STABILIZATION OF SI PHOTOANODES IN AQUEOUS ELECTROLYTES THROUGH SURFACE ALKYLATION

CROSS REFERENCE TO RELATED APPLICATION

This application claims priority under 35 USC 119 from Provisional application No. 60/084,277, filed May 4, 1998.

STATEMENT AS TO FEDERALLY SPONSORED RESEARCH

The U.S. Government has certain rights in this invention pursuant to Grant No. CHE-9634152 awarded by the National Science Foundation.

BACKGROUND

Silicon is often used as a semiconductor material for many purposes. The surface of silicon is very chemically active; and easily combines with many materials, including oxygen. The "oxide" formed on the surface can impede the characteristics of the silicon.

Semiconductors having band gaps between 0.9 and 1.7 eV are often used in photoelectrochemical solar energy conversion devices. Silicon has a band gap of 1.12 eV, and is an especially attractive material for this application.

A typical way of forming a silicon semiconductor, e.g., a photodiode, is to use wet chemical etching with HF(eq), resulting in a hydrogren-terminated Si surface. This surface is electrically suitable when initially formed. However, this surface readily oxidizes in air or in water-containing ambients. An oxide on the surface introduces electrical defect states. This also forms an insulating, passivating overlayer. That overlayer can impede the semiconductor characteristics. For example, this can impede photocurrent flow through an electrochemical cell.

It is often important to stabilize Si electrodes in aqueous media. Previous art has suggested coating the surface of Si electrodes with islands or films of metal. This process creates buried Si/metal junctions on protected regions of the electrode. This can be undesirable.

SUMMARY

The present specification describes silicon surfaces derivatized with covalently-attached alkyl chains used to protect the surface. A preferred mode uses a halogenation/alkylation procedure in which the surface is treated with a halogen, e.g., chlorine, and then an alkyl-containing material. The silicon surface is preferably in contact with an aqueous $Fe(CN)_6^{3-/4-}$. These surfaces are treated with the alkyl groups, or "derivatized." This forms covalent Si—C linkages and these covalent Si—C linkages protect the surface against oxidation.

A preferred mode uses CH3 as the alkyl group.

DETAILED DESCRIPTION

Introduction of functional groups onto the Si surface through silanization chemistry can enhance the stability of Si electrodes at low light levels in water with certain redox species. However, the electrical quality of the surface can be compromised by a thin native oxide layer on the surface.

Crystalline Si surfaces have been recently functionalized by chlorination/alkylation or radical-based olefin addition methods.

Figure 1A:
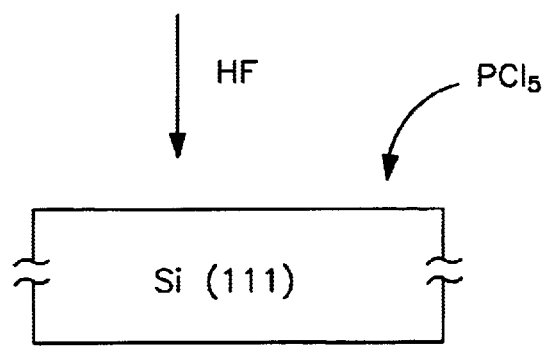
FIGS. 1(a) and 1(b) show steps of the overall process of surface protection.

The preferred devices are formed using (111)-oriented n-type Si single crystals. FIG. 1A shows initial steps of first HF-etching and then chlorinating these crystals for 40–50 min at 90–100° C. in a 0.6–0.7 M solution of $PCl_5$ in chlorobenzene, with benzoyl peroxide added as a radical initiator. This leaves a chlorinated Si surface.

While the above describes the halogen treatment being done with chlorine, it should be understood that other halogens could be used, e.g. bromine or iodine or others. Flourine is not preferred as a halogen material since the C—F bond is strong and may be difficult to displace.

Figure 1B:
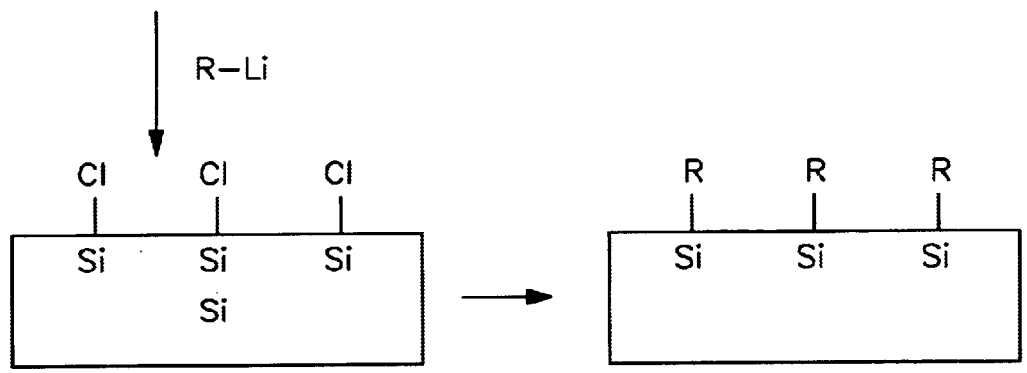

FIG. 1B shows exposure of the chlorinated Si surfaces to an alkyl-containing reagent. For example, the alkyl-containing reagent can be alkyl Li, R—Li, for example, R=$C_4H_9$, $C_6H_{13}$ or alkyl Grignard $RM_gBR$. For example, R=$CH_3$, $C_2H_5$ reagents for 4–12 hours at 65–80° C. More generally, the alkyl-containing reagent can be any $C_nH_{2n+1}$. This exposure produces an alkylated Si surface with the "R" group from the alkyl-containing reagent attached to the surface.

This procedure has been shown by a variety of methods, including X-ray photoelectron spectroscopy (XPS), infrared spectroscopy, and high-resolution electron energy loss spectroscopy (HREELS), to produce surficial Si—C bonds. These bonds protect the surface, and improve its long term stability and semiconductor characteristics.

Figure 2A:
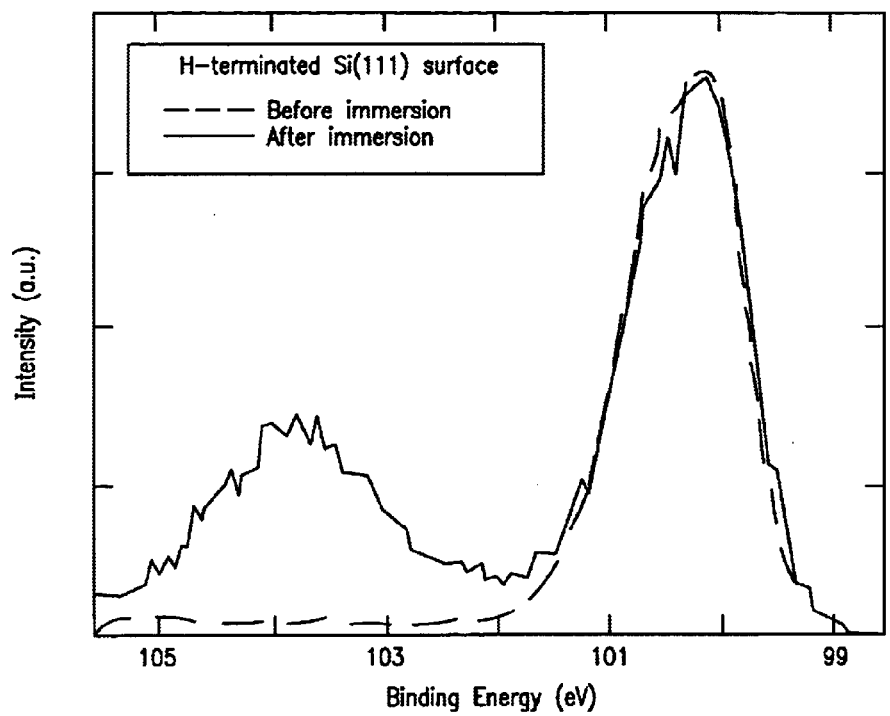
FIG. 2(a) shows a high-resolution XP spectro of the Si 2 p region.

The results are explained with reference to the following. FIG. 2a depicts a high-resolution XP spectrum that was observed for this structure. A H-terminated n-type Si(111) electrode is placed in contact with 0.35 M $K_4Fe(CN)_6$-0.05 M $K_3Fe(CN)_6$ (aq) for 10 min at room temperature. The Si 2p XPS peak ratios indicate that approximately three monolayers of oxide were produced on the Si surface during this immersion step, even though negligible light-induced current had passed through the interface. As many as 10 monolayers may exist on this surface.

Figure 2B:
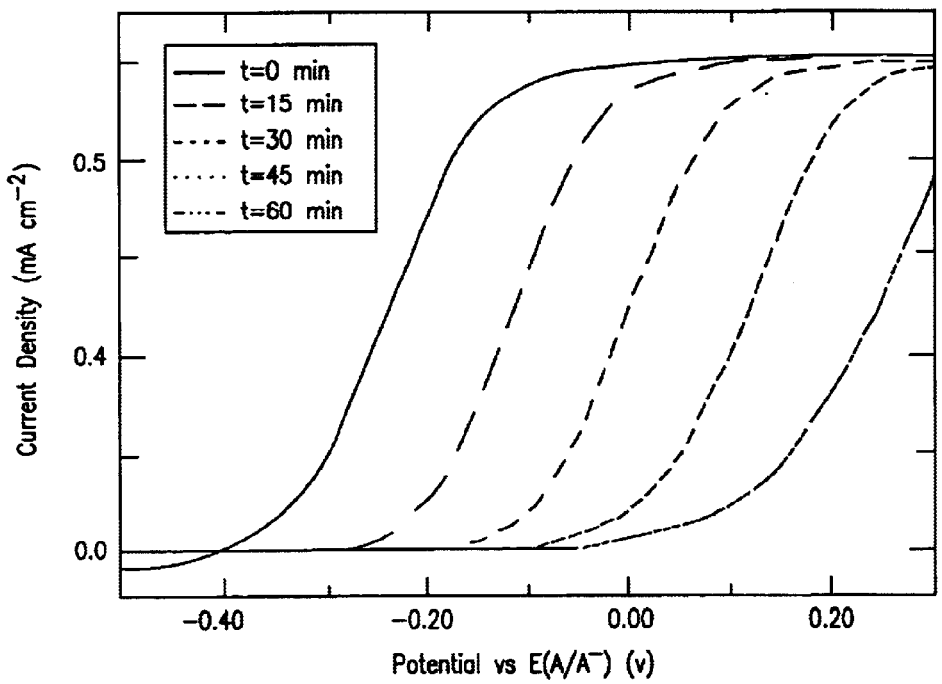
FIG. 2(b) shows the time-dependence of the J-E behavior of a H-terminated Si electrode in contact with $Fe(CN)_6^{3-/4-}$ (aq) solution

FIG. 2b shows the J-E curves were collected at a scan rate of 50 mV $_s^{-1}$ and potentials were recorded in a three-electrode potentiostatic configuration vs a Pt wire reference electrode that was poised at the Nernstian potential of the redox couple, E(A/A$^-$). The Si electrode was illuminated with the white light output of an ELH-type tungsten-halogen bulb. As displayed in FIG. 2b, the first electrochemical current density (J) vs potential (E) scan of this surface, at a light intensity sufficient to produce a short-circuit photocurrent density of 1.0 mA cm$^{-2}$, showed a sigmoidally-shaped curve with a low open-circuit voltage ($V_{oc}$) and a low fill factor for conversion of incident light into electrical energy.

Thus, the electron-hole pairs produced by illumination of the Si resulted in an anodic photocurrent that oxidized the Si surface. Subsequent scans displayed further deterioration in the performance of the electrode with time. Even though this electrolyte solution contained >0.3 M of the hole scavenger $Fe(CN)_6^{4-}$, oxidation of Si competed effectively with hole scavenging by the redox couple.

Figure 3A:
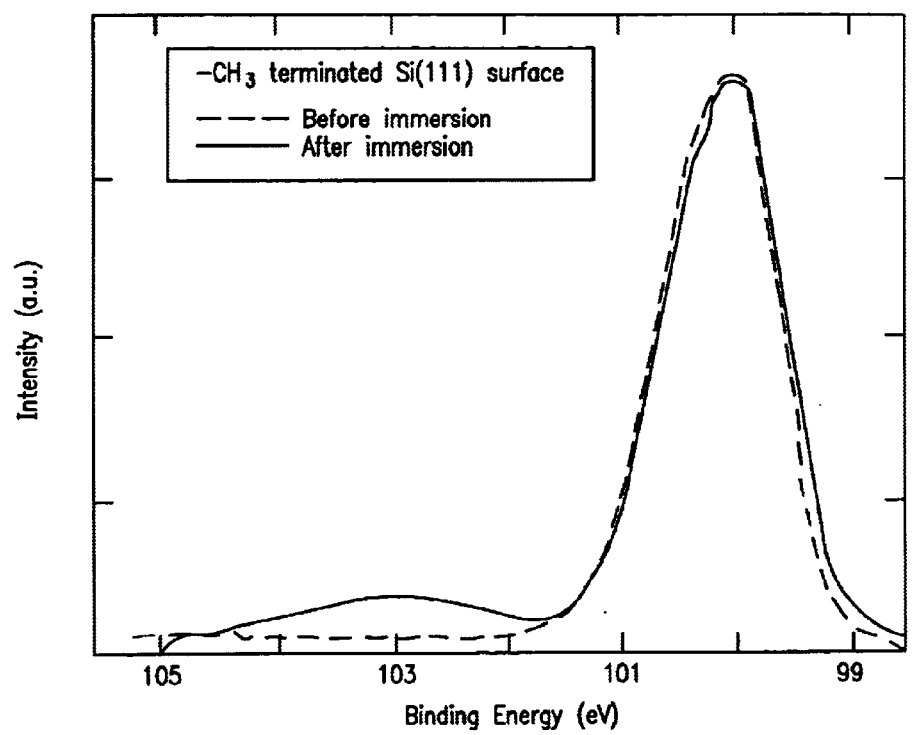
FIG. 3(a) shows a representative high-resolution XP spectra of the Si 2 p region of a $CH_3$-terminated n-type Si(111) surface.
Figure 3B:
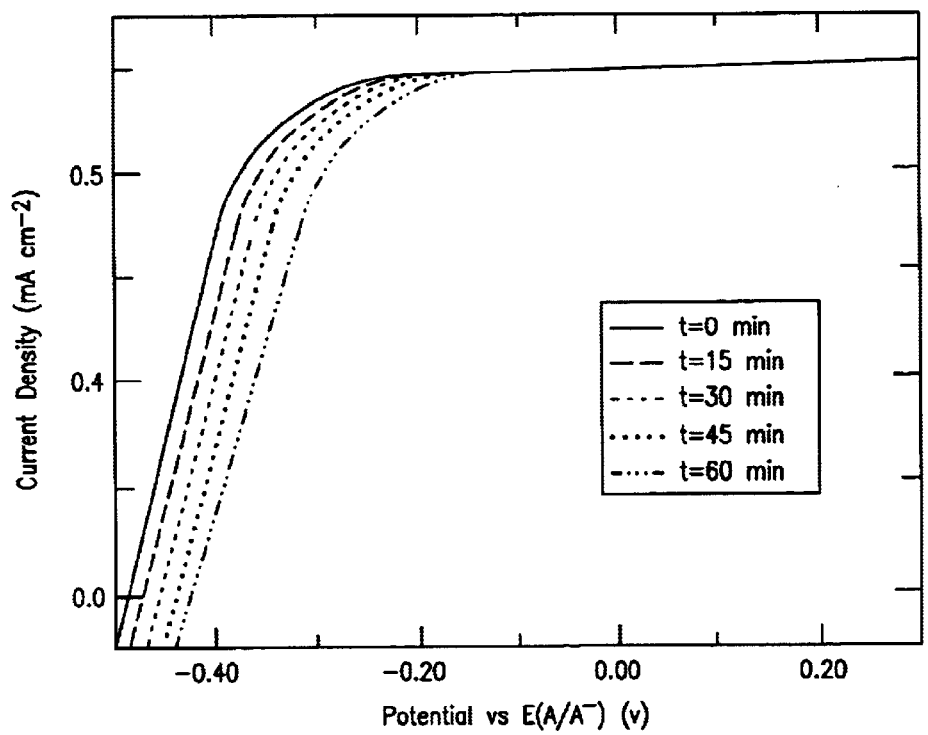
FIG. 3(b) shows time-dependence of the J-E behavior of a —$CH_3$-terminate surface in contact with $FE(CN)_6^{3-/4-}$ (aq) solution.

A Si electrode tested has been modified by treatment with $PCl_5$ and then with $CH_3MgBr$. This is immersed in the $FE(CN)_6^{3-/4-}$ solution for 10 min at room temperature. FIG. 3a depicts a high-resolution XP spectrum for this material. The spectrum suggests that this surface shows less than one monolayer of oxide (FIG. 3a). In contrast to the H-terminated Si surface, the initial J-E curve of this electrode showed negligible hysteresis and good rectification with a high fill factor (FIG. 3b). For comparison, n-Si/Au Schottky contacts only produce $V_{oc}$=0.23 V at these light intensities, and n-SI photoanodes coated with a thin native oxide and then modified with chlorosilylferrocene reagents only produce $V_{oc}$-0.30 V in contact with the $Fe(CN)_6^{3-/4-}$ electrolyte. Negligible Mg could be detected on the functionalized Si surfaces by XPS, and the photovoltage of the functionalized Si/liquid contact is higher than that for any known direct n-Si/metal contact (owing to the presence of Fermi level pinning at Si/metal contacts).

Thus, the electrochemical properties of this system probably are not based on interaction of a semiconductor/metal Schottky barrier from residual metal deposits on the Si owing to the reaction process. The J-E characteristics of the alkylated surface were also much more stable than those of the H-terminated surface, and the electrochemical properties of such electrodes decayed only very slowly during the passage of anodic photocurrent at this photocurrent density (FIG. 3b).

Figure 4A:
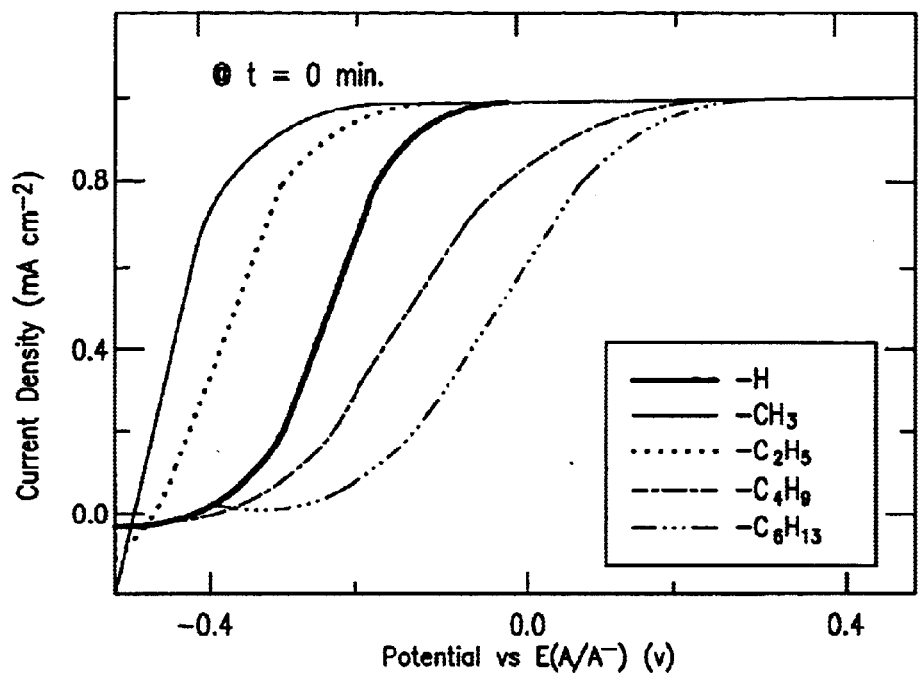
FIG. 4 shows a representative current density-potential (J-E) characteristics of silicon surfaces derivatized with alkyl groups of various chain lengths in is; contact with 0.35 M $Fe(CN)_6^{4-}$-0.05 M $Fe(CN)_6^{3-}$ (aq).

The characteristics of the material also depend on the chain length of the alkyl-containing reagent. FIG. 4a depicts the dependence of the J-E characteristics on that. All of the alkylated Si electrodes show high open-circuit voltages. This indicates that the functionalization step, for any chain length herein investigated has not introduced high levels of electrical recombination sites onto the Si surface. Table 1 shows this relationship. In fact, the observed photovoltages were very close to the optimal values expected from a junction limited only by minority carrier recombination in the bulk of the semiconductor, as opposed to a device dominated by surface recombination or by capture of majority carriers by the redox ions in the electrolyte.

FIG. 4a also indicates that electrodes that had been alkylated with longer chain length reagents showed lower fill factors relative to the fill factor displayed by the methyl-($CH_3$)-terminated Si surface. Functionalization with —$C_4H_9$, for example, produced a unit area series resistance of ~280 $cm^2$, as compared to a value of ~17 $cm^2$ for a methyl-terminated surface. The larger resistance values degraded the electrochemical performance of the photoelectrode despite a high photovoltage of the system. The increased electrical series resistance displayed by these electrodes is consistent with expectations for an increased charge transfer resistance through thicker alkyl overlayers that has been observed for self-assembled monolayers of thiols on Au surfaces.

Figure 4B:
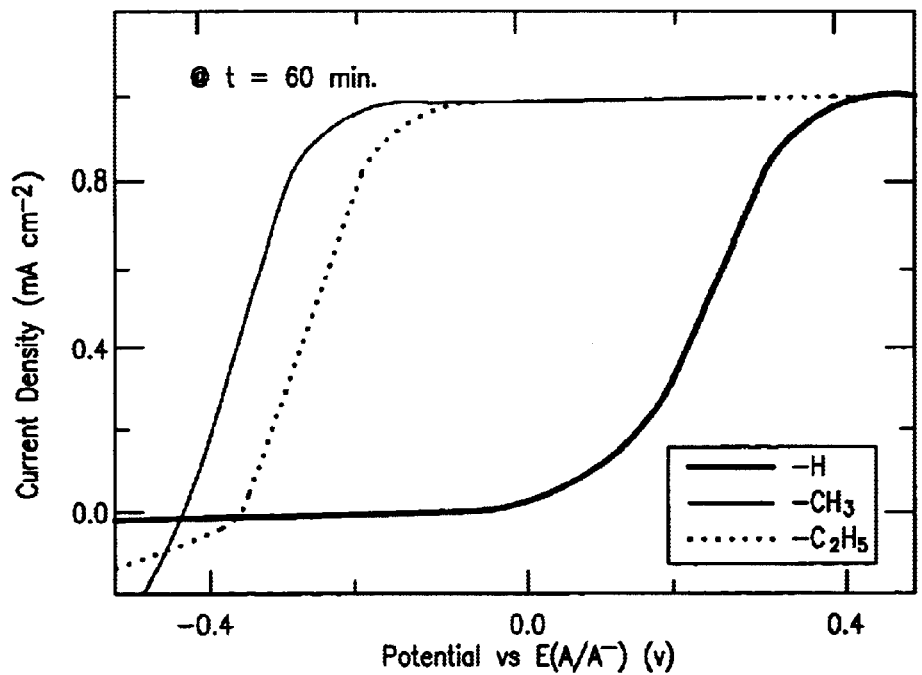

FIG. 4b displays the J-E characteristics of these functionalized electrodes after they had been maintained at a light-limited current density of 1.0 mA $cm^{-2}$ for 60 min. The $V_{oc}$ fill factor of the —$CH_2$— and —$C_6H_5$— terminated Si surfaces even at 0.6 V reverse bias after 60 min of illumination in contact with this electrolyte. This shows that two competing factors contribute to the initial stability and the subsequent decay of the J-E characteristics of alkyl-terminated Si surfaces in contact with the $Fe(CN)_6^{3-/4-}$ (aq) solution. The formation of a strong Si—C bond stabilizes the surface and reduces its propensity toward oxidation. In addition, on the branching ratio between the faradaic current that leads to hole transfer to $Fe(CN)_6^{4-}$ and that which leads to Si oxidation is sensitive to the packing density, the series resistance, and other structural features of the overlayer.

Shorter alkyl groups, therefore, have certain electrochemical advantages. Alkyl groups where n is 1 or 2, and most preferably $CH_3$ therefore, are preferred for electrochemical applications because such overlayers have the least series resistance to interfacial charge transfer. However, longer chains can be more suitable for improving the stability of Si in contact with air, where no faradaic current need flow through the circuit. The behavior displayed in FIG. 4b also indicates the advantages, in certain applications, that are provided by the two-step chlorinational/alkylation procedure. This latter technique provides a facile synthetic route to methylated Si surfaces as well as to surfaces functionalized with longer alkyl chains.

In conclusion, the results described herein demonstrate that the formation of a stable, covalent bond between alkyl chains and silicon surfaces can be used to impart stability to Si surfaces, e.g., photoanodes, against oxidation in contact with an aqueous environment. The improved resistance towards oxidation has been achieved without significant compromises to the electrochemical quality of the silicon surface in contact with these electrolytes. The functionalization strategy can be applied in both aqueous and water-containing gaseous ambients and seems to offer a promising approach to modifying, at the molecular level, the chemical properties of Si surfaces for various possible uses in electrochemical and electronic devices.

TABLE 1

Current Density-Potential (U-E) Properties of H-Terminated and Alkyl-Terzninated Si(111) surfaces in Contact with 0.35 M $Fe(CN)_6^{4-}$-0.05 M $Fe(CN)_6^{3-}$ (aq)

| | J-E properties in FE $(CN)_6^{3-/4-}$ (aq)[a] | | | |
|---|---|---|---|---|
| terminal | t = 0 min | | t = 60 min | |
| group, R | $V_{oc}$ (V) | fill factor | $V_{oc}$ (V) | fill factor |
| —H | 0.42 | 0.34 | 0.22 | 0.08 |
| —$CH_3$ | 0.48 | 0.64 | 0.42 | 0.57 |
| —$C_2H_5$ | 0.45 | 0.53 | 0.35 | 0.46 |
| —$C_4H_9$ | 0.40 | 0.22 | b | b |
| —$C_6H_{13}$ | 0.36 | 0.13 | b | b |

Data were collected at a light intensity sufficient to provide a light-limited photocurrent density of 1.0 mA $cm_{-2}$. [b]The $C_4H_9$ and $C_6H_{13-}$ J-E curves could not be recorded even at 0.6 V reverse bias for such surfaces after 60 min of operation.

What is claimed:

1. A method of using a silicon material having a silicon surface, comprising alkylating the surface with an organic material to form an organic overlayer bonded to the silicon surface; and placing the silicon material within an aqueous solution, wherein the aqueous solution contains at least one electrolyte.

2. The method of claim 1, wherein said at least one electrolyte renders said aqueous solution ionically conductive.

3. The method of claim 1, wherein said at least one electrolyte renders said aqueous solution conductive to electrical current.

4. The method of claim 1, wherein said at least one electrolyte is $K_3Fe(CN)_6$ or $K_4Fe(CN)_6$.

5. The method of claim 1, wherein said silicon surface is halogenated prior to said alkylating of said surface.

6. The method of claim 5, wherein said halogenating is performed using a chlorine-containing compound, a bromine-containing compound, or an iodine-containing compound.

7. The method of claim 5, wherein said halogenating is performed using a chlorine-containing compound.

8. The method of claim 1, wherein the organic material comprises a $C_nH_{2n+1}$ alkyl group, wherein n is 1 or greater.

9. The method of claim 8, wherein the alkyl group is $CH_3$.

10. A method of using a silicon material having a silicon surface comprising:

reacting the silicon surface with a chlorine-containing compound to form a chlorinated silicon surface;

exposing the chlorinated silicon surface to a metal alkyl-containing reagent, wherein:

the metal alkyl-containing reagent comprises an alkyl group selected from the group consisting of $CH_3$ and $C_2H_5$; and the alkyl group is bonded to the silicon surface and is part of an organic overlayer; and placing the silicon material and the organic overlayer within an aqueous electrolytic solution, wherein the organic overlayer lies between the silicon surface and the aqueous electrolytic solution.

11. The method of claim 10, wherein the alkyl group is $CH_3$.

12. The method of claim 11, wherein the organic overlayer is a monolayer of $CH_3$ groups along the silicon surface.

13. A method for applying a potential to a silicon surface in contact with an aqueous solution containing at least one electrolyte, comprising: alkylating the surface with an organic material to form an organic overlayer bonded to the silicon surface; applying a potential to the silicon surface; and contacting the silicon surface with the aqueous solution.

* * * * *